(12) United States Patent
Saptharishi et al.

(10) Patent No.: US 11,326,956 B2
(45) Date of Patent: May 10, 2022

(54) FACE AND INNER CANTHI DETECTION FOR THERMOGRAPHIC BODY TEMPERATURE MEASUREMENT

(71) Applicant: MOTOROLA SOLUTIONS, INC., Chicago, IL (US)

(72) Inventors: Mahesh Saptharishi, Sudbury, MA (US); Pietro Russo, Melrose, MA (US); Peter L. Venetianer, McLean, VA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/987,099

(22) Filed: Aug. 6, 2020

(65) Prior Publication Data
US 2022/0042851 A1 Feb. 10, 2022

(51) Int. Cl.
*G01J 5/00* (2022.01)
*G01J 5/10* (2006.01)
*G06T 7/60* (2017.01)
*G01J 5/53* (2022.01)
(Continued)

(52) U.S. Cl.
CPC .............. *G01J 5/0025* (2013.01); *G01J 5/10* (2013.01); *G01J 5/53* (2022.01); *G06T 7/60* (2013.01);
(Continued)

(58) Field of Classification Search
CPC ............ G01J 5/0025; G01J 5/10; G01J 5/522; G06K 9/00248; G06T 7/60
See application file for complete search history.

(56) References Cited

U.S. PATENT DOCUMENTS

2003/0108223 A1\* 6/2003 Prokoski ................ A61B 5/418
382/115
2005/0271117 A1 12/2005 Grassl et al.
(Continued)

FOREIGN PATENT DOCUMENTS

EP 1646310 B1 7/2015

OTHER PUBLICATIONS

Budzan et al., "Face and eyes localization algorithm in thermal images for temperature measurement of the inner canthus of the eyes," Infrared Physics & Technology, 2013, vol. 60, pp. 225-234.
(Continued)

*Primary Examiner* — Hugh Maupin
(74) *Attorney, Agent, or Firm* — Michael Best & Friedrich LLP

(57) ABSTRACT

One example temperature sensing device includes an electronic processor configured to receive a thermal image of a person captured by a thermal camera. The electronic processor is configured to determine a first temperature and a first location of a first hotspot on the person. The electronic processor is configured to determine a second location of a second hotspot on the person based on the second location being approximately symmetrical with respect to the first location about an axis, and the second hotspot having a second temperature that is approximately equal to the first temperature. The electronic processor is configured to determine a distance between the first location of the first hotspot and the second location of the second hotspot. In response to determining that the distance is within the predetermined range of distances, the electronic processor is configured to generate and output an estimated temperature of the person.

20 Claims, 6 Drawing Sheets

(51) Int. Cl.
*G06V 40/16* (2022.01)
*G01J 5/48* (2022.01)

(52) U.S. Cl.
CPC ............ *G06V 40/165* (2022.01); *G01J 5/48* (2013.01); *G01J 2005/0077* (2013.01); *G06T 2207/10048* (2013.01)

(56) References Cited

U.S. PATENT DOCUMENTS

| | | | | |
|---|---|---|---|---|
| 2007/0153871 A1* | 7/2007 | Fraden | ............... | G01J 5/0022 |
| | | | | 374/121 |
| 2008/0077019 A1* | 3/2008 | Xiao | ............... | A61B 5/0064 |
| | | | | 600/474 |
| 2015/0216423 A1* | 8/2015 | Beilin | ............... | A61B 5/4884 |
| | | | | 600/549 |

OTHER PUBLICATIONS

Jaddoa et al., "Automatic Eyes Localization in Thermal Images for Temperature Measurement in Cattle," 12th International Conference on Intelligent Systems and Knowledge Engineering, 2017, pp. 1-6.

Marzec et al., "Fast eye localization from thermal images using neural networks," Multimedia Tools and Applications, 2016, pp. 1-14.

Vardasca et al., "The influence of angles and distance on assessing inner-canthi of the eye skin temperature," Thermology International, 2017, vol. 27(4), pp. 130-135.

* cited by examiner

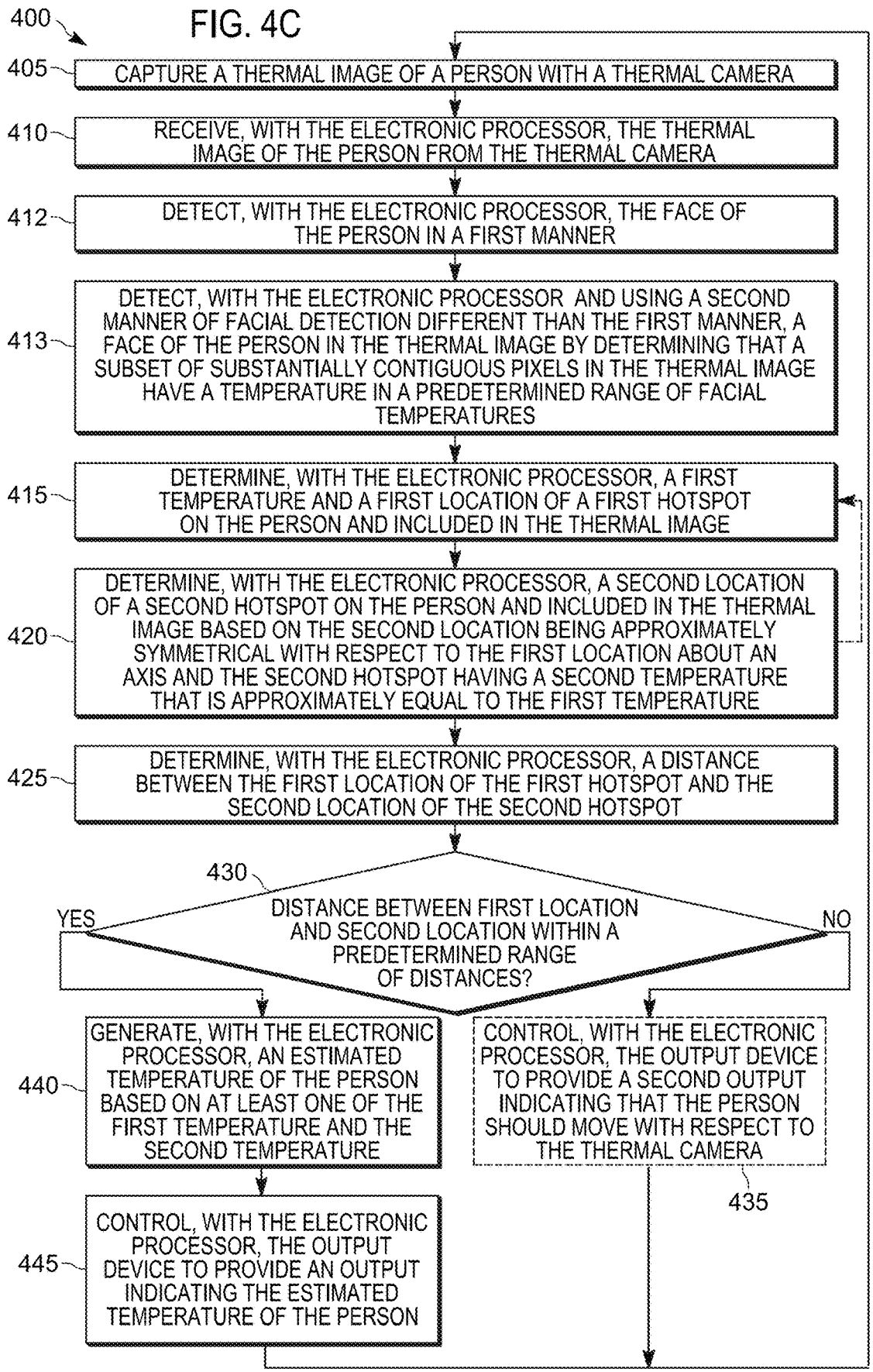

FACE AND INNER CANTHI DETECTION FOR THERMOGRAPHIC BODY TEMPERATURE MEASUREMENT

BACKGROUND OF THE INVENTION

Temperature measuring devices may use thermographic imaging to measure/estimate a body temperature of a subject (e.g., a person). However, in some situations, existing temperature measuring devices provide inaccurate measurements, measure/estimate a temperature of an unintended region included in a thermal image, and/or require manual adjustment by a user to measure an intended region of the person.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 4A through 4C are flowcharts of a method performed by the temperature sensing device of FIG. 2 to estimate the temperature of a person according to example embodiments described herein.

Figure 1:
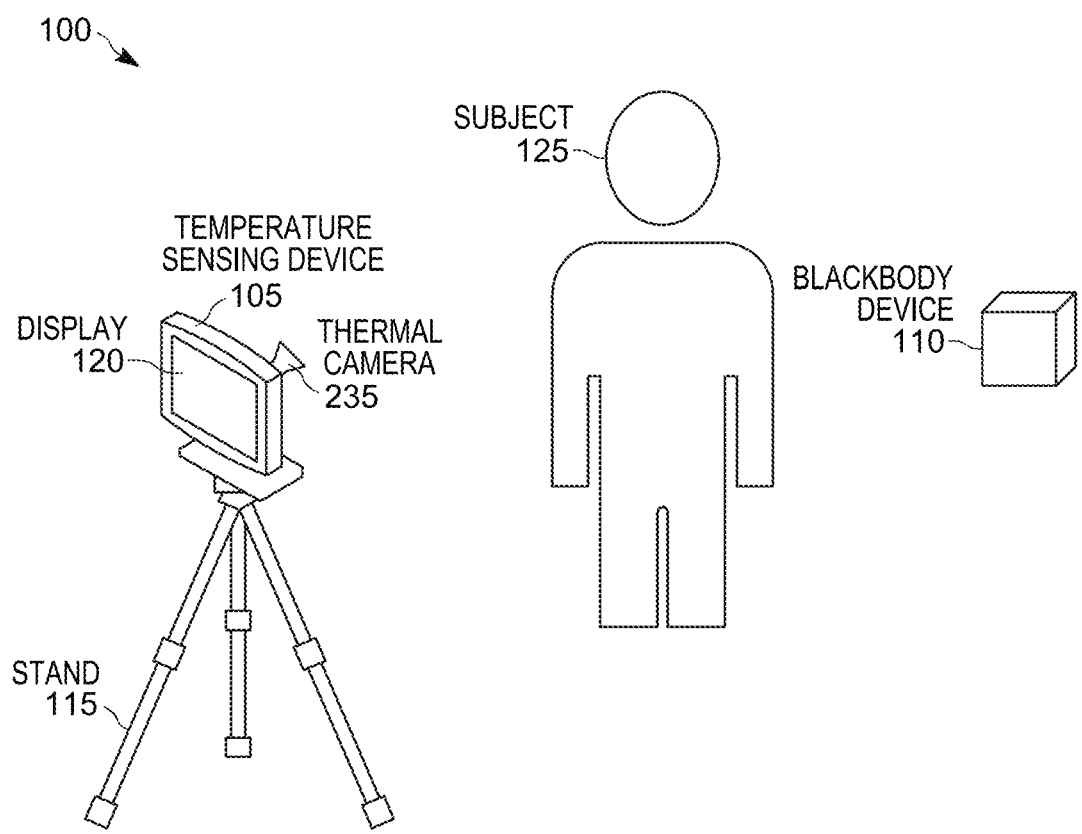
FIG. 1 is diagram of a temperature measuring/sensing system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When estimating body temperature of a subject (e.g., a person) using thermographic infrared imaging, an inner canthus region of an eye of the person may provide an accurate estimate of the body temperature. However, existing temperature measuring devices that use thermographic imaging may not explicitly, accurately, and/or consistently identify the inner canthus region of the person. Accordingly, in some situations, existing temperature measuring devices may provide inaccurate measurements/estimates, may measure/estimate a temperature of an unintended region included in the thermal image, and/or may require manual adjustment by a user to include an intended region of the person in the thermal image and measure the temperature of the intended region of the person.

For example, some existing devices are configured to measure a hottest spot in a region of interest and/or may require a user to direct a thermal camera of the temperature measuring device at the region of interest. When using such devices, the user may direct the thermal camera inaccurately such that only a portion of a person's face is included in a thermal image captured by the thermal camera. Accordingly, an inner canthus region of the person may not be included in the thermal image. In this example, the device may determine a temperature of the hottest spot in the thermal image despite the thermal image not including the inner canthus of the person.

Continuing this example in another situation, the thermal image may include an inner canthus of an eye of the person, but a different spot on the person's face may be hotter than the inner canthus (e.g., if the person's was recently exposed to the sun). In this example, the device may determine an incorrect body temperature of the person because the inner canthus region was not used to determine the body temperature.

Another potential disadvantage of existing temperature measuring devices that use thermographic imaging is that such devices may not provide accurate measurements when the person whose body temperature is being measured/estimated is not substantially directly facing the thermal camera. For example, the thermal camera may not be able to fully capture the inner canthi of the person in a thermal image to obtain an accurate temperature measurement/estimate but may nevertheless provide a temperature measurement/estimate.

Finally, even temperature measuring devices that detect the face of the person whose body temperature is to be measured do not ensure accurate detection of the inner canthi of the person to further ensure accurate body temperature measurement. For example, a face detecting machine learning algorithm may be trained using non-thermal images (e.g., images captured by a camera in the human-visible spectrum) and may not be able to accurately detect faces within a thermal image that includes, for example, infrared data that is not within the visible spectrum. As another example, even when the person's face has been detected, a temperature measuring device configured to measure the temperature of the hottest spot on the face may provide inaccurate body temperature measurements in some example situations as described above (e.g., when the hottest spot on the face does not correspond to an inner canthus region).

Accordingly, there is a technological problem with temperature measuring devices that use thermographic imaging (e.g., infrared imaging) to estimate body temperature of a person.

To address this technological problem, disclosed are, among other things, a device, a method, and a system to explicitly detect inner canthi of a person whose temperature is to be measured/estimated using thermographic infrared imaging (i.e., using video/image analytics). The disclosed device, method, and system also may ensure that the person is adequately spaced from a thermal camera to ensure an accurate body temperature measurement/estimate based on the temperature of the inner canthi. In some embodiments, the device, method, and system are additionally configured to more accurately detect (and/or confirm a previous detection of) a face of the person within a thermal image using video/image analytics of thermal/infrared images. Accordingly, the disclosed device, method, and system may result in improved accuracy in a body temperature measurement/estimate of a person and decreased user/operator interaction to obtain an accurate body temperature measurement/estimate. For example, unlike existing temperature measuring devices that may provide a temperature measurement/estimate when the person whose body temperature is being measured/estimated is not substantially directly facing the thermal camera, the disclosed device, method, and system may refrain from providing a temperature measurement/estimate in such situations when a thermal camera may not be able to fully capture the inner canthi of the person in a thermal image.

One embodiment provides a temperature sensing device that may include an output device configured to provide an output, and a thermal camera configured to capture a thermal image of a person. The temperature sensing device may include an electronic processor coupled to the output device and to the thermal camera. The electronic processor may be configured to receive the thermal image of the person from the thermal camera. The electronic processor may be further configured to determine a first temperature and a first location of a first hotspot on the person and included in the thermal image. The electronic processor may be further configured to determine a second location of a second hotspot on the person and included in the thermal image based on the second location being approximately symmetrical with respect to the first location about an axis, and the second hotspot having a second temperature that is approximately equal to the first temperature. The electronic processor may be further configured to determine a distance between the first location of the first hotspot and the second location of the second hotspot. The electronic processor may be further configured to determine whether the distance between the first location and the second location is within a predetermined range of distances. In response to determining that the distance is within the predetermined range of distances, the electronic processor may be further configured to generate an estimated temperature of the person based on at least one of the first temperature and the second temperature. The electronic processor may be further configured to control the output device to provide the output. The output may indicate the estimated temperature of the person.

Another embodiment provides a method for determining a temperature of a person. The method may include capturing, with a thermal camera of a temperature sensing device, a thermal image of the person. The method may further include receiving, with an electronic processor of the temperature sensing device, the thermal image of the person from the thermal camera. The method may further include determining, with the electronic processor, a first temperature and a first location of a first hotspot on the person and included in the thermal image. The method may further include determining, with the electronic processor, a second location of a second hotspot on the person and included in the thermal image based on the second location being approximately symmetrical with respect to the first location about an axis, and the second hotspot having a second temperature that is approximately equal to the first temperature. The method may further include determining, with the electronic processor, a distance between the first location of the first hotspot and the second location of the second hotspot. The method may further include determining, with the electronic processor, whether the distance between the first location and the second location is within a predetermined range of distances. The method may further include in response to determining that the distance is within the predetermined range of distances, generating, with the electronic processor, an estimated temperature of the person based on at least one of the first temperature and the second temperature. The method may further include controlling, with the electronic processor, an output device to provide an output indicating the estimated temperature of the person.

For ease of description, some or all of the example systems and devices presented herein are illustrated with a single example of each of its component parts. Some examples may not describe or illustrate all components of the systems or devices. Other example embodiments may include more or fewer of each of the illustrated components, may combine some components, or may include additional or alternative components.

FIG. 1 is a diagram of a temperature measuring/sensing system 100 according to one example embodiment. In the example illustrated, the system 100 includes a temperature sensing device 105 (i.e., a temperature measuring device) and a blackbody device 110. As shown in FIG. 1, the temperature sensing device 105 may be mounted on a stand 115 and may include a separate or integrated display 120. In other words, although the thermal camera 235 is shown as being integrated with the display 120 in FIG. 1, in other embodiments, the thermal camera 235 and the display 120 are physically and/or logically separate from each other. In some embodiments, the temperature sensing device 105 is configured to measure/estimate a body temperature of a subject 125 (e.g., a person) as described in greater detail herein.

Although FIG. 1 illustrates a stand 115, in some embodiments, the temperature sensing device 105 is mounted on other mobile/semi-mobile objects, for example, a cart or is mounted on a permanent/semi-permanent structure such as a wall or cabinet. In some embodiments, the blackbody device 110 is mounted on the same object/structure as the temperature sensing device 105. For example, the stand 115 may include an extendable arm to which the blackbody device 110 is mounted. In some embodiments, the temperature sensing device 105 is a hand-held device and operated by a user to measure/estimate the body temperature of the subject 125.

In some embodiments, the blackbody device 110 is a physical device of a known temperature that may be used by the temperature sensing device 105 as a temperature reference value when determining the body temperature of the subject 125 as described in greater detail herein. In some embodiments, the blackbody device 110 is configured to be positioned such that the blackbody device 110 is included in a thermal image captured by a thermal camera 235 (see FIG. 2) of the temperature sensing device 105.

FIG. 1 illustrates only one example embodiment of the temperature sensing system 100. In other embodiments, the system 100 may include more or fewer components and may perform functions that are not explicitly described herein. In some embodiments, the system 100 may not include the blackbody device 110. In such embodiments, the temperature sensing device 105 determines the body temperature of the subject 125 without using a known reference temperature value from the blackbody device 110. Although only one blackbody device 110 is shown in FIG. 1, in some embodiments, additional blackbody devices 110 of the same temperature or of different temperatures may be included in the system 100.

Figure 2:
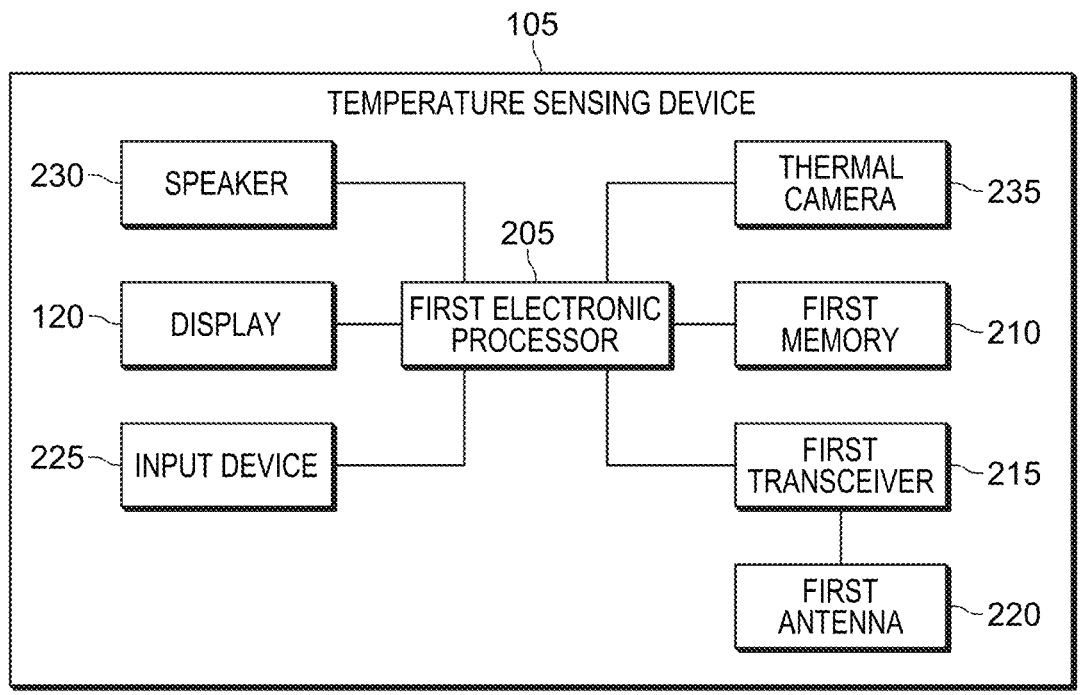
FIG. 2 is a block diagram of a temperature sensing device of the temperature sensing system of FIG. 1 according to one example embodiment.

FIG. 2 is a block diagram of the temperature sensing device 105 of the temperature sensing system 100 according to one embodiment. In the example shown, the temperature sensing device 105 includes a first electronic processor 205 (for example, a microprocessor or another electronic device). The first electronic processor 205 may include input and output interfaces (not shown) and, in the example shown, is electrically connected to a first memory 210, a first transceiver 215 including or connected to an antenna 220 (the combination of which may be referred to as a first network interface), the display 120, an input device 225 (e.g., a button, a keypad, etc.), a speaker 230, and a thermal camera 235. In some embodiments, the temperature sensing device 105 may include fewer or additional components in configurations different from that illustrated in FIG. 2. For example, the temperature sensing device 105 may also include a haptic device and/or one or more additional cameras such as non-thermal cameras that operate in spectra other than the infrared spectrum. As another example, the temperature sensing device 105 may not include one or more of the first transceiver 215 and the first antenna 220, the display 120, the input device 225, and the speaker 230. In some embodiments, the temperature sensing device 105 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein. In some embodiments, the first memory 210 stores one or more respective reference temperature values of respective blackbody devices 110. In such embodiments, the first electronic processor 205 retrieves the stored reference temperature values from the first memory 210 to determine the temperature of one or more pixels included in a thermal image (and/or an average temperature of a subset of pixels analyzed collectively).

The combination of the first transceiver 215 and the antenna 220 (in other words, the first network interface) is configured to send and receive data to and from an external device (e.g., the blackbody device 110) and/or a communication network. For example, the first transceiver 215 is a wireless communication transceiver for wirelessly communicating with external devices and/or networks. Alternatively or additionally, the first network interface may include a connector or port for receiving a wired connection to an external device or network, such as an Ethernet cable.

The thermal camera 235 (e.g., thermographic camera) may be configured to capture one or more thermal images of the subject 125 (e.g., a person). For example, the thermal camera 235 includes an infrared detector that is configured to create a thermal image using infrared data to indicate a respective temperature of each pixel of an array of pixels included in the thermal image (and/or an average temperature of a subset of pixels analyzed collectively). The first electronic processor 205 receives data indicative of a captured thermal image from the thermal camera 235.

One or both of the thermal camera 235 and the first electronic processor 205 determines, in one example, the respective temperature of one or more pixels included in thermal images by comparing infrared data of the one or more pixels to infrared data of pixels included in the thermal image that represent the blackbody device 110. In other words, because the blackbody device 110 has a known temperature that may be used by the temperature sensing device 105 as a temperature reference value, the temperature sensing device 105 may determine a temperature of one or more other pixels included in the thermal image based on a relative difference in intensity between the one or more other pixels with respect to pixels that represent the blackbody device 110. In some embodiments, the thermal camera 235 and/or the first electronic processor 205 determines that a subset of pixels of a thermal image represent the blackbody device 110 by (i) determining that the subset of pixels are each within an expected intensity range (and/or an average intensity of the subset of pixels when analyzed collectively is within an expected intensity range) and/or (ii) determining that the subset of pixels form a shape, size, and/or consistency that corresponds to an expected shape, size, and/or consistency of the blackbody device 110.

In some embodiments, the first electronic processor 205 is configured to determine that the blackbody device 110 is at least partially occluded in a thermal image that was captured by the thermal camera 235. In other words, the first electronic processor 205 is configured to determine that the blackbody device 110 is not fully visible or not visible at all within a thermal image, which may prevent the temperature sensing device 105 from being able to determine a temperature of one or more pixels included in the thermal image. In response to determining that the blackbody device 110 is at least partially occluded in the thermal image, the first electronic processor 205 controls an output device (e.g., the display 120, the speaker 230, a haptic device, and/or the like) to provide an output indicating that the blackbody device 110 is at least partially occluded in the thermal image based on the current field of view of the thermal camera 235 and/or that a temperature measurement/estimate may not be accurately performed. This output may allow the user of the temperature sensing device 105 to move the thermal camera 235 (or to move/rotate the blackbody device 110) or to perform a status check of the blackbody device 110 to ensure that it has power and is functioning properly. This output may additionally or alternatively allow the person (i.e., subject 125) to move with respect to the thermal camera 235 to allow the blackbody device 110 to be included within a field of view of the thermal camera 235.

In some embodiments, the first electronic processor 205 is configured to analyze the thermal image data as described herein to generate an estimated body temperature of the subject. The first electronic processor 205 may also be configured to control one or more output devices (e.g., the display 120, the speaker 230, a haptic device, etc.) of the temperature sensing device 105 to provide an output that indicates the estimated temperature of the subject 125.

In some embodiments, the input device 225 is a button actuated by a user to instruct the temperature sensing device 105 (i.e., the first electronic processor 205) to obtain the estimated body temperature of the subject 125. In other embodiments, the temperature sensing device 105 automatically obtains the estimated body temperature of the subject 125 by analyzing thermal images from the thermal camera 235 and determining that a subject 125 is located in field of view of the thermal camera 235 at a distance and location in which inner canthi of the subject 125 is visible and accurately measurable. In some embodiments, the input device 225 is a keypad, keyboard, or touch screen integrated into the display 120 that is configured to receive user inputs from a user or service technician (e.g., updated programming parameters/settings, firmware updates, etc.). In some embodiments, the input device 225 includes a microphone to allow for at least some features of the temperature sensing device 105 to be voice-activated.

Figure 3:
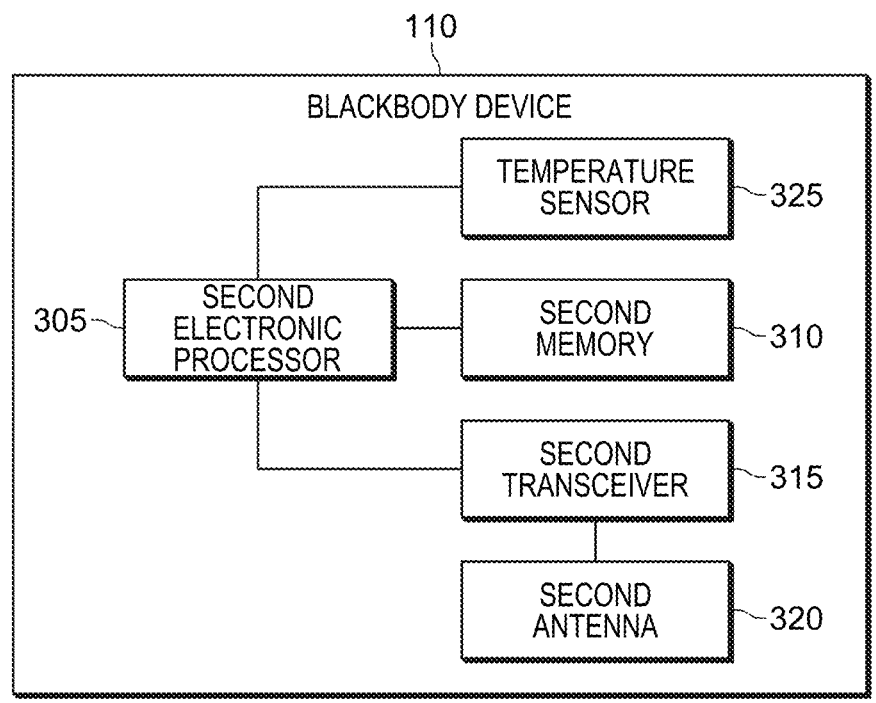
FIG. 3 is a block diagram of a blackbody device of the temperature sensing system of FIG. 1 according to one example embodiment.

FIG. 3 is a block diagram of the blackbody device 110 according to one embodiment. In some embodiments, the blackbody device 110 radiates energy based on its absolute temperature. Accordingly, a temperature of the blackbody device 110 may remain substantially constant and may provide a reference temperature to be used by the temperature sensing device 105 to determine the temperature of other pixels included in a thermal image along with the blackbody device 110. In the example illustrated in FIG. 3, the blackbody device 110 includes a second electronic processor 305, an input/output interface (not shown), a second memory 310, a second transceiver 315, and a second antenna 320 (i.e., a second network interface). These components are similar to those described above with respect to the temperature sensing device 105 and perform similar general functions.

In some embodiments, the blackbody device 110 includes a temperature sensor 325 (e.g., a thermistor) electrically coupled to the second electronic processor 305. In some embodiments, the second electronic processor 305 determines the temperature of the blackbody device 110 based on data received from the temperature sensor 325. The second electronic processor 305 may transmit the temperature of the blackbody device 110 to the temperature sensing device 105 via the second transceiver 315 and the second antenna 320 (e.g., to be used as a reference temperature by the temperature sensing device 105). In other words, the first electronic processor 205 of the temperature sensing device 105 may receive a reference temperature value from the blackbody device 110 for use in determining the temperature of one or more pixels included in a thermal image.

In some embodiments, the blackbody device 110 may include fewer or additional components in configurations different from that illustrated in FIG. 3. For example, in some embodiments, the blackbody device 110 includes a display and/or an input device. In other embodiments, the blackbody device 110 may not include any circuitry/intelligence/logic. For example, the blackbody device 110 may merely be a physical object whose temperature is independently measured and entered into the input device 225 of the temperature sensing device 105 for storage in the first memory 210 as a reference temperature.

Figure 4A:
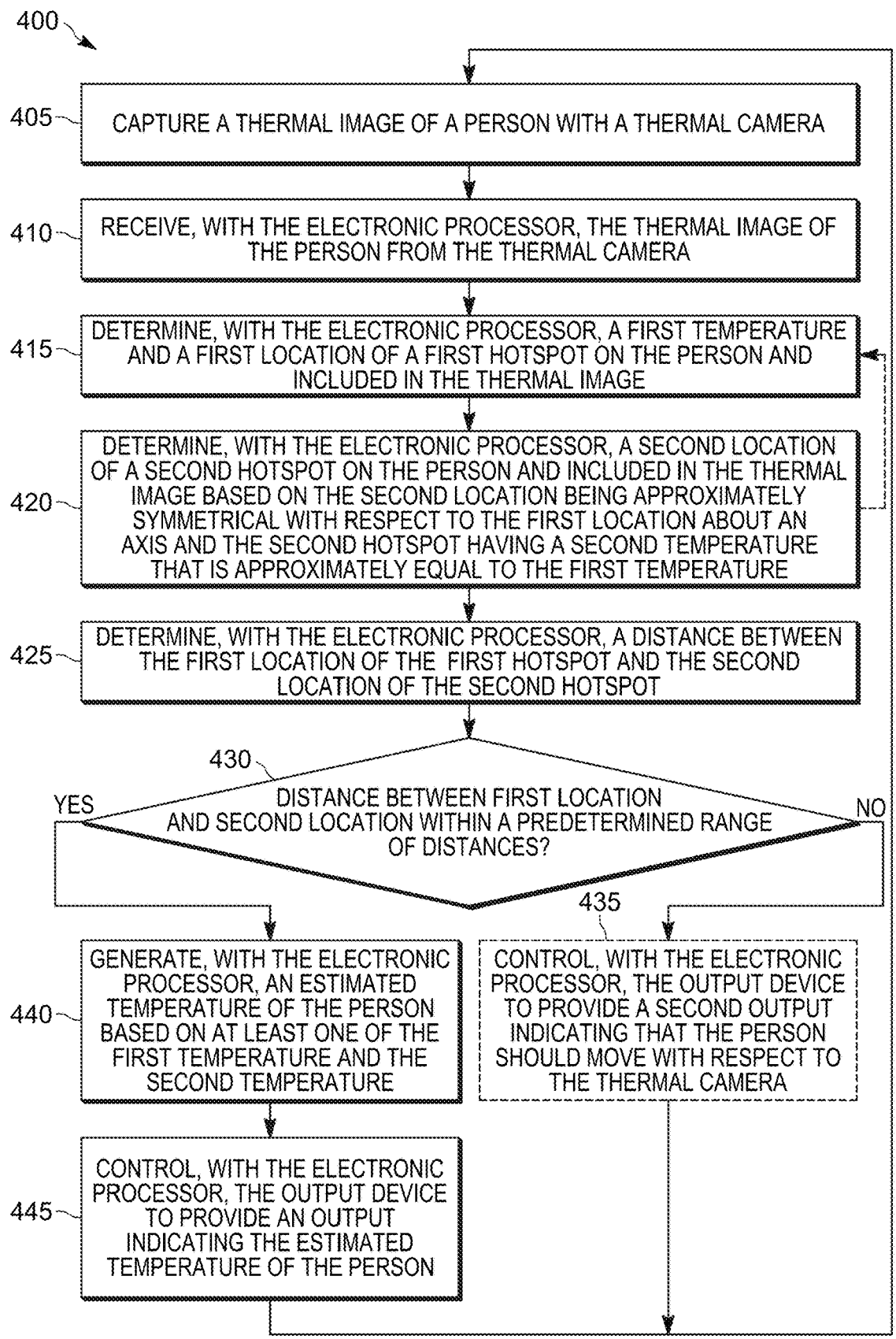
Figure 4B:
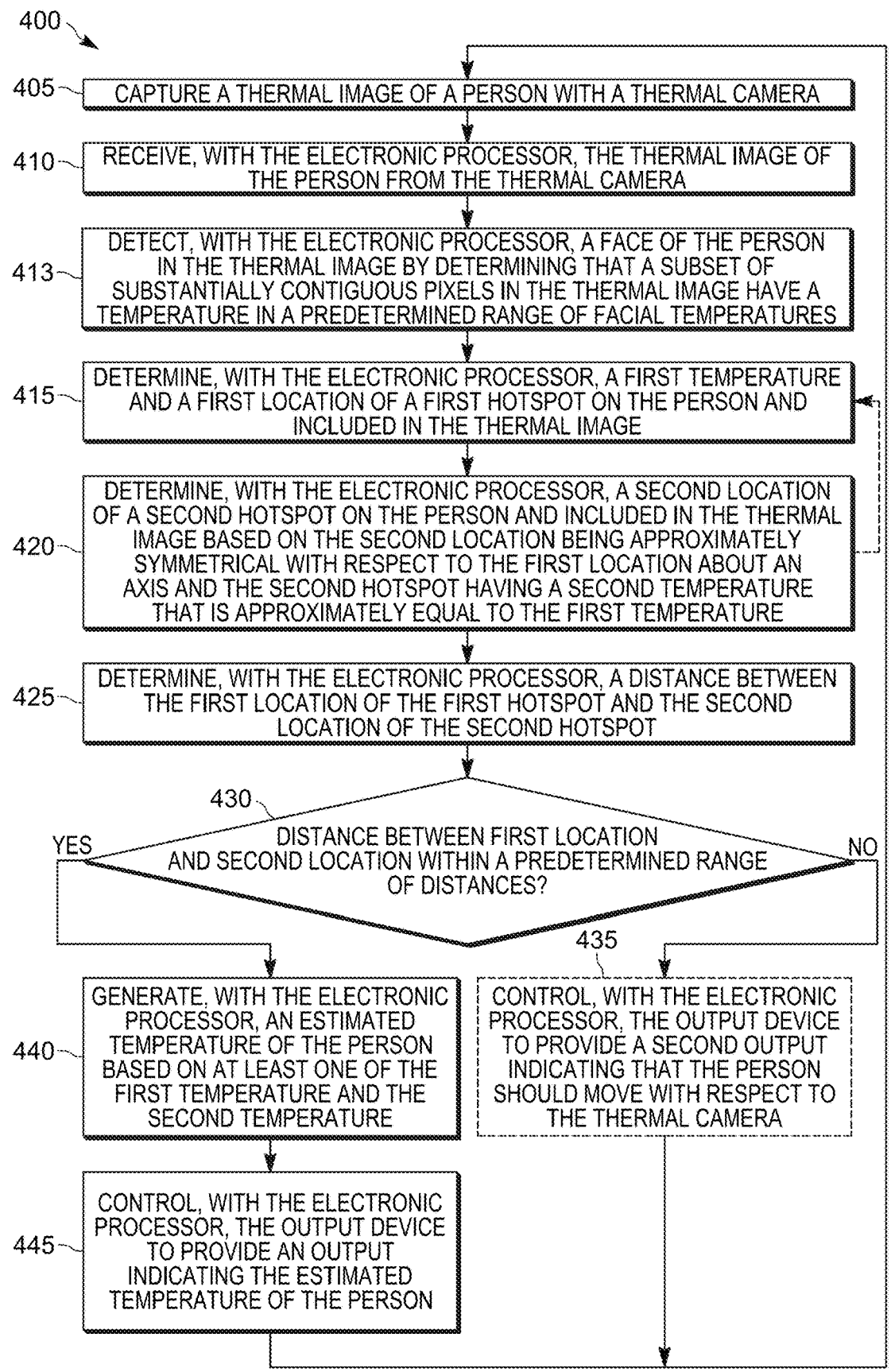

FIGS. 4A through 4C illustrates flowcharts of a method 400 performed by the first electronic processor 205 of the temperature sensing device 105 to determine the temperature of a person (i.e., the subject 125) according to example embodiments disclosed herein. While a particular order of processing steps, message receptions, and/or message transmissions is indicated in FIGS. 4A through 4C as an example, timing and ordering of such steps, receptions, and transmissions may vary where appropriate without negating the purpose and advantages of the examples set forth in detail throughout the remainder of this disclosure. Most blocks of the method 400 are identical in FIGS. 4A through 4C, but each flowchart has slight variations according to different embodiments as explained herein.

At block 405, the thermal camera 235 captures a thermal image of a person (i.e., the subject 125). At block 410, the first electronic processor 205 receives the thermal image of the person (i.e., data corresponding to the thermal image) from the thermal camera 235.

In some embodiments, the first electronic processor 205 controls the thermal camera 235 to capture the thermal image of the person in response to the input device 225 receiving a user input from a user as described previously herein. In other embodiments, the first electronic processor 205 analyzes a plurality of thermal images from the thermal camera 235 and automatically identifies the thermal image of the person from among the plurality of thermal images. In one example, the first electronic processor 205 periodically captures thermal images and attempts to identify a person (e.g., a person's face) in the thermal images. In response to detecting a face in a thermal image, the first electronic processor 205 may perform further processing/analysis of the thermal image as explained herein. In response to not detecting a person or a face in the thermal image, the first electronic processor 205 may discard the thermal image and continue controlling the thermal camera 235 to periodically capture thermal images. Even in embodiments in which the thermal camera 235 is configured to capture a thermal image of the person in response to the input device 225 receiving a user input from a user, the first electronic processor 205 may still be configured to detect a person's face within the thermal image.

As shown in the embodiment of method 400 illustrated in FIG. 4B, the first electronic processor 205 may be configured to detect the face of the person by determining that a subset of pixels included in the thermal image have a respective temperature (or an average temperature when analyzed collectively) in a predetermined range of facial temperatures (e.g., approximately 30 degrees Celsius to approximately 40 degrees Celsius) (see block 413 of FIG. 4B). The first electronic processor 205 may determine that areas of the thermal image that include pixels outside of the predetermined range of facial temperatures do not include human faces.

Once the first electronic processor 205 has identified one or more areas of the thermal image that include pixels with a respective temperature in the predetermined range of facial temperatures, the first electronic processor 205 is configured to determine that a subset of pixels define a substantially contiguous area of the thermal image that at least one of a group consisting of (i) is within a predetermined range of sizes and (ii) corresponds to one of a plurality of predetermined shapes (see block 413 of FIG. 4B). For example, if a number of individual pixels and/or clusters of pixels scattered non-contiguously throughout the thermal image have a temperature in the predetermined range of facial temperatures, the first electronic processor 205 may determine that these pixels do not correspond to the face of person because a person's face in the thermal image is often a single, substantially contiguous object. Continuing this example, if a subset of substantially contiguous pixels within the thermal image has a temperature in the predetermined range of facial temperatures and the subset of pixels is (i) within a predetermined range of sizes and/or (ii) corresponds to one of a plurality of predetermined shapes, the first electronic processor 205 may identify the subset of substantially contiguous pixels as a person's face. The first electronic processor 205 may identify the person's face despite the other individual pixels and/or clusters of pixels around the face in the thermal image that may have a temperature in the predetermined range of facial temperatures and that may be interpreted as a noise.

A thermal image may include a few outlier pixels within a contiguous object where the outlier pixels have a different temperature than the other pixels representing the object (e.g., a temperature outside the predetermined range of facial temperatures). The term "substantially contiguous area" is meant to account for these outlier pixels that may include erroneous and/or different temperatures for various reasons. In other words, an oval-shaped contiguous area in a thermal image with an average temperature for its pixels within the predetermined range of facial temperatures may be determined to be a face despite having 0.5%, 1%, 5%, or the like of random pixels within the contiguous area having temperatures outside the predetermined range of facial temperatures. In some embodiments, the first electronic processor 205 determines that a substantially contiguous area in a thermal image is a face in response to a threshold percentage of pixels within the substantially contiguous area having a temperature within the predetermined range of facial temperatures.

As an example of the device 105 using a predetermined range of sizes to aid with facial detection in a thermal image, the first electronic processor 205 is programmed or otherwise configured to identify an object (i.e., a subset of pixels that define a substantially contiguous area of the thermal image) as a human face when the object takes up 20%-50% of the thermal image. As another example, if a small subset of pixels within the predetermined facial temperature range only takes up a small amount of the thermal image (e.g., 1%, 5%, or the like), the first electronic processor 205 may not identify these pixels as representing the face of a person because the face of the person may be expected to take up a larger portion of the thermal image (e.g., based on pre-programmed settings). As yet another example, if a large subset of pixels within the predetermined temperature range takes up a large amount of the thermal image (e.g., 80%, 90%, 100%, or the like), the first electronic processor 205 may not identify these pixels as representing a face of a person because the face of the person may be expected to take up a smaller portion of the thermal image (e.g., based on pre-programmed settings). In either of the above examples, in response to not detecting a face in the thermal image, the first electronic processor 205 may control one or more output devices to provide an output that indicates that an object with an expected facial temperature was identified but that the object was too small or too big within the thermal image to identify the object as a face.

Figure 5A:
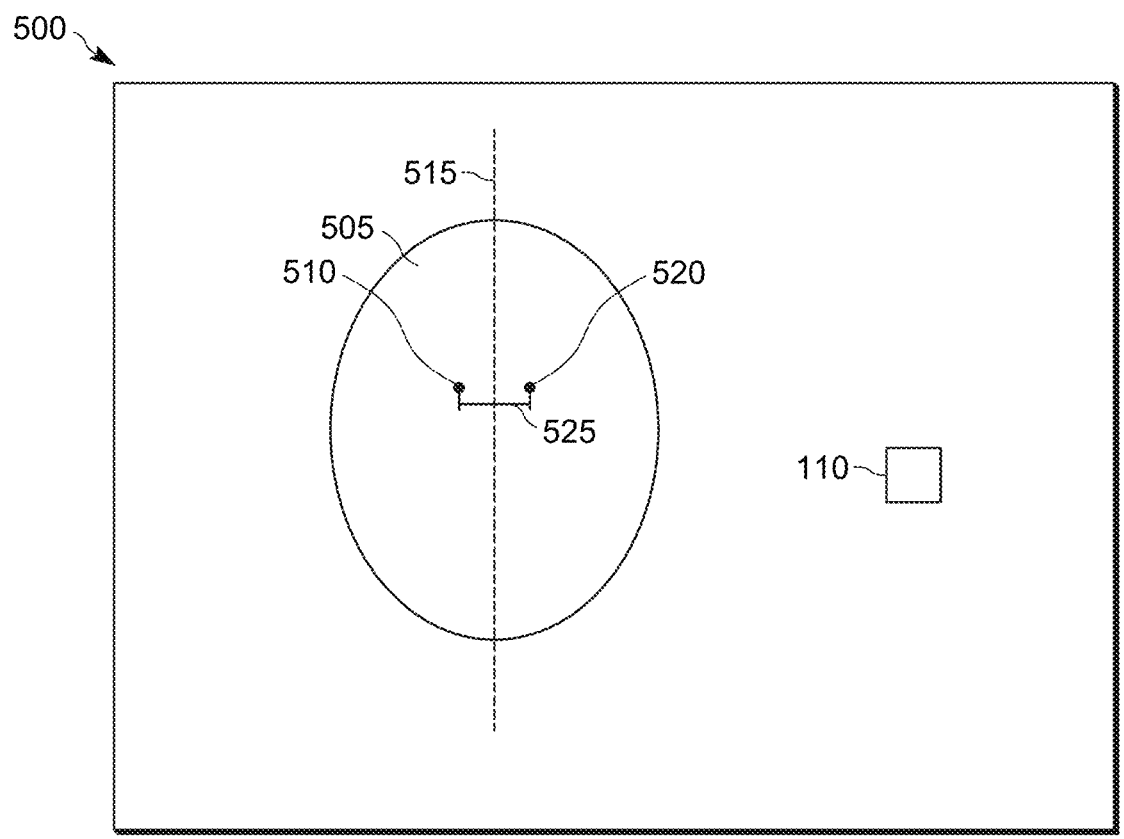
FIGS. 5A and 5B illustrate simplified example thermal images captured by the temperature sensing device of FIG. 2 according to example embodiments described herein.

As an example of the device 105 using a plurality of predetermined shapes to aid with facial detection in a thermal image, the first electronic processor 205 may be programmed to identify an object (i.e., a subset of pixels that define a substantially contiguous area of the thermal image) as a human face when the object is substantially the shape of an oval, a circle, or another shape generally similar to the expected outline of human face/head (see FIG. 5A). In some embodiments, the first electronic processor 205 is configured to recognize other shapes in the thermal image as a human face. For example, the electronic processor 205 is programmed to recognize a top portion of a substantial oval, circle, or the like as a human face under the assumption that a bottom portion of the shape/person's face (i.e., their nose, mouth, and chin) may be covered with a mask and may therefore be outside the predetermined range of facial temperatures that define the object (see FIG. 5B).

The above values of temperatures, percentages, etc. are merely examples and may be programmed differently in different embodiments and use cases.

Figure 5B:
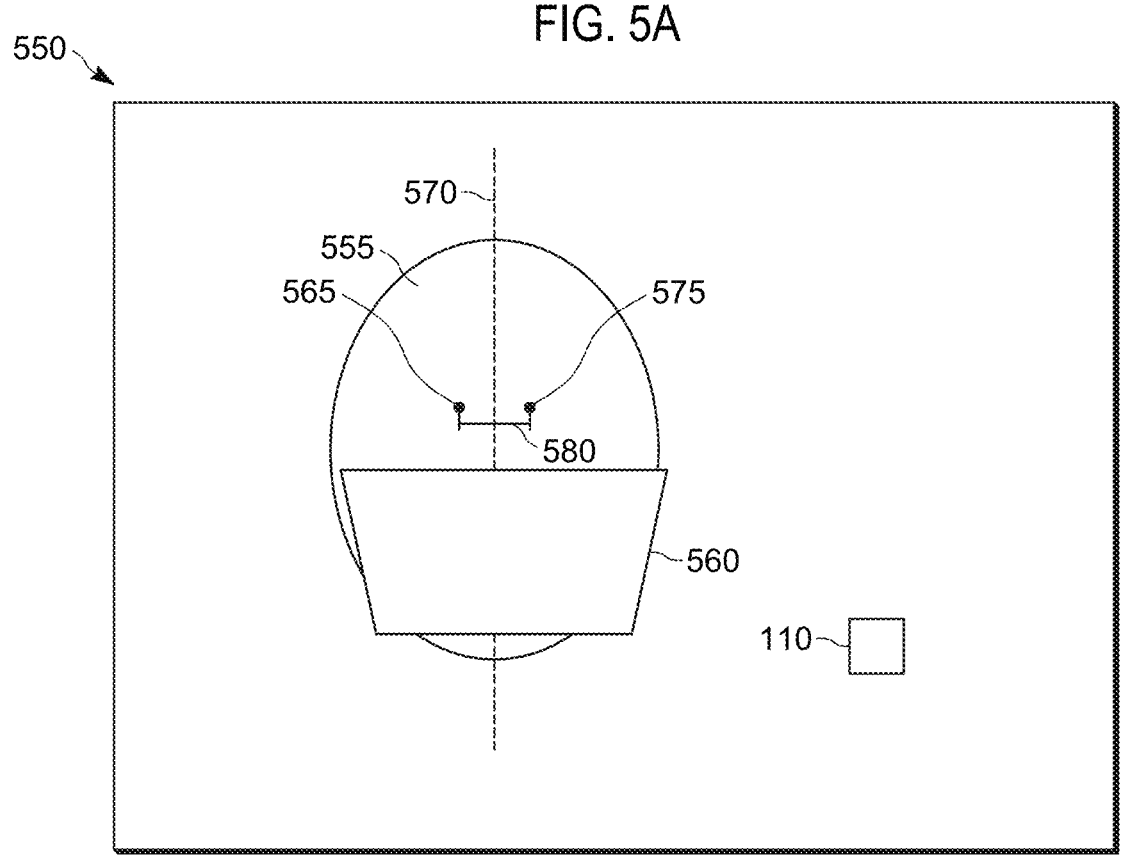

FIGS. 5A and 5B illustrate simplified example thermal images 500 and 550, respectively. With reference to FIG. 5A, the first electronic processor 205 may determine that an object 505 (i.e., a subset of pixels that define a substantially contiguous area of the thermal image 500) where all or most of the pixels that define the object 505 have a temperature (or an average temperature when analyzed collectively) within the predetermined range of facial temperatures. The first electronic processor 205 may also determine that the object 505 is within a predetermined range of sizes and/or corresponds to a plurality of predetermined shapes (e.g., an oval) that correspond to the face of a person. Accordingly, the first electronic processor 205 may determine that the object 505 is a face of a person.

The first electronic processor 205 may make similar determinations with respect to an object 555 shown in the thermal image 550 of FIG. 5B. As shown in FIG. 5B, the object 555 (i.e., the face of the person) may be covered with a second object 560 (i.e., a mask) such that the shape of the object 555 is different than the shape of the object 505. Nevertheless, the first electronic processor 205 may be configured to detect both objects 505 and 555 as a face of a person using the methods described previously herein.

As shown in the embodiment of method 400 illustrated in FIG. 4C, the first electronic processor 205 may be configured to detect the face of the person in a thermal image in a first manner (see block 412 of FIG. 4C). The first manner of facial detection may not involve use of absolute temperature information of pixels included in the thermal image (see block 412 of FIG. 4C). The first electronic processor 205 may then confirm the detection of the face of the person in the first manner using a second manner of facial detection different than the first manner. For example, the second manner of facial detection includes determining that the face of the person detected in the first manner corresponds to a subset of pixels included in the thermal image that each have a respective absolute temperature (or an average temperature when analyzed collectively) in a predetermined range of facial temperatures and that define a substantially contiguous area of the thermal image that is within at least one of a group consisting of a predetermined range of sizes and a predetermined range of shapes (see block 413 of FIG. 4C). In some embodiments, the first electronic processor 205 may implement facial detection using absolute temperature information (see block 413 of FIG. 4C) to confirm other manners of facial detection (see block 412 of FIG. 4C) that may be less accurate and/or to increase accuracy of facial detection in general.

As an example, at block 412 of FIG. 4C, the first electronic processor 205 may be configured to detect the face of a person using a facial detection algorithm that was trained on non-thermal/infrared images (e.g., color or grey-scale images in the human-visible spectrum). Alternatively, at block 412 of FIG. 4C, facial detection algorithms may be used that were trained on thermal/infrared images and may or may not have been trained using absolute temperatures of pixels included in the thermal image to attempt to detect a face as disclosed herein. As an example, radiometric thermal images include the absolute temperature value per pixel whereas non-radiometric thermal images may only include temperature gradients. In some embodiments, detecting the face of the person in a first manner (see block 412 of FIG. 4C) includes any facial detection method that does not determine that a subset of substantially contiguous pixels within a thermal image has a temperature in the predetermined range of facial temperatures. Accordingly, once the first electronic processor 205 has detected the face of the person in the first manner (see block 412 of FIG. 4C), the first electronic processor 205 may use a second, different manner of facial detection that uses the absolute temperature information of the area in the thermal image that was detected to be a face (see block 413 of FIG. 4C). Thus, the first electronic processor 205 may implement facial detection using absolute temperature information to confirm other different manners of facial detection and increase accuracy of facial detection in general.

In some situations, using two different types of facial detection techniques (e.g., at blocks 412 and 413 of FIG. 4C)

may increase the amount of objects initially detected to be faces while also providing verification that the initially-detected objects are truly faces. Thus, using two different types of facial detection techniques may decrease both false positives and false negatives regarding facial detection. Additionally, because absolute thermal/temperature-based facial detection (at block 413 of FIGS. 4B and 4C) may only detect an object as a face when the object is within the predetermined range of facial temperature, this facial detection method itself may be more accurate (e.g., less false positives) than other facial detection techniques that do not use absolute temperature of pixels in a thermal image because many/most objects in a thermal image may not fall within this temperature range. Additionally, using absolute thermal/temperature-based facial detection alone (at block 413 of FIG. 4B) may allow for faster processing times and less power being used by the first electronic processor 205 than may be used when using more complicated facial detection techniques that analyze images in the human-visible spectrum.

In some embodiments, when implementing facial detection in a first manner (at block 412 of FIG. 4C), the first electronic processor 205 may nevertheless use the thermal image to implement the facial detection as described above (e.g., using a facial detection algorithm based solely on historical training of previous images). However, the confirmation of facial detection in a second manner that uses absolute temperature information included in the thermal image (at block 413 of FIG. 4C) may increase the reliability/accuracy of facial detection in the thermal image in this example situation and in general.

In some embodiments, the thermal camera 235 may instead be a multi-spectrum camera (or the temperature sensing device 105 may have multiple cameras) configured to capture images across the electromagnetic spectrum. In such embodiments, the multi-spectrum camera may be configured to capture different images in different spectra. In some embodiments, the multi-spectrum camera is configured to filter the same image such that a single captured image may be a thermal image (i.e., showing infrared data in the infrared spectrum), a visible spectrum image in a portion of the electromagnetic spectrum that is visible to the human eye, and/or an image in another portion of the electromagnetic spectrum.

Although not shown as a separate block in the method 400 of FIG. 4A, in some embodiments as shown in FIGS. 4B and 4C, the method 400 includes one or more blocks between the blocks 410 and 415. In such embodiments, these additional blocks may relate to the first electronic processor 205 detecting a face in a thermal image captured by the thermal camera 235 as described above. In some embodiments, further additional blocks that are not shown in FIGS. 4A through 4C may additionally or alternatively relate to the first electronic processor 205 determining whether the blackbody device 110 is fully included or at least partially occluded in the thermal image captured by the thermal camera 235.

At block 415, the first electronic processor 205 determines a first temperature and a first location of a first hotspot 510, 565 on the person (e.g., on the face of the subject 125) and included in the thermal image 500, 550. For example, FIGS. 5A and 5B show first hotspots 510, 565 in one example situation. In some embodiments, the first electronic processor 205 may be configured to determine that the pixels representing the hotspot 510, 565 in the thermal image 500, 550 have a higher temperature than the other pixels representing other portions of the face 505, 555 of the person in the thermal image 500, 550. The first electronic processor 205 may also be configured to determine that the pixels representing the hotspot 510, 565 form a substantially contiguous object 510, 565 that has a shape that is substantially circular, substantially oval-shaped, or the like.

In some embodiments, the first electronic processor 205 is configured to determine the first temperature and the first location of the first hotspot 510, 565 by determining that the first temperature is within a predetermined range of temperatures (e.g., approximately 35 degrees Celsius to approximately 40 degrees Celsius). For example, the predetermined range of temperatures may be a predetermined range of expected inner canthi temperatures that is a subset of the predetermined range of facial temperatures described previously herein.

In some embodiments, the first electronic processor 205 is configured to determine the first location of the first hotspot 510, 565 after detecting the face 505, 555 of the person. In some embodiments, the first electronic processor 205 is configured to attempt to detect the hotspot 510, 565 in an area on the detected face 505, 555 where an inner canthus of an eye of the person is assumed to be located. For example, the first electronic processor 205 is configured to assume that the inner canthus of an eye of the person is located on a top portion of the face 505, 555 and off-center from an axis 515, 570 that extends substantially symmetrically through the face 505, 555 of the person (e.g., between eyes of the person, through an approximate center of a forehead of the person, and through an approximate center of a chin of the person as shown in FIGS. 5A and 5B). As indicated by the above examples, in some embodiments, the first location of the first hotspot 510, 565 determined by the first electronic processor 205 corresponds to a first inner canthus of a first eye of the person (i.e., the subject 125).

At block 420, the first electronic processor 205 determines a second location of a second hotspot 520, 575 on the person and included in the thermal image 500, 550 based on (i) the second location being approximately symmetrical with respect to the first location of the first hotspot 510, 565 about an axis 515, 570, and (ii) the second hotspot 520, 575 having a second temperature that is approximately equal to the first temperature of the first hotspot 510, 565. In some embodiments, the second location of the second hotspot 520, 575 determined by the first electronic processor 205 corresponds to a second inner canthus of a second eye of the person (i.e., the subject 125). By performing blocks 415 and 420, the first electronic processor 205 is configured to detect the locations and temperatures of the inner canthi of the eyes of the person. In some embodiments, the first electronic processor 205 is configured to determine the locations of the first hotspot 510, 565 and the second hotspot 520, 575 by determining that two subsets of pixels included in the thermal image 500, 550 are at least one of each substantially circular, substantially-oval-shaped, etc. arranged substantially symmetrically about the axis 515, 570 with respect to each other, and of approximately the same temperature within a predetermined range of facial temperatures. Although the examples explained herein with respect to FIGS. 5A and 5B include a first hotspot 510, 565 that corresponds to the inner canthus of the right eye of the person and a second hotspot 520, 575 that corresponds to the inner canthus of the left eye person, in some situations, the first electronic processor 205 identifies a first hotspot that corresponds to the inner canthus of the left eye of the person and a second hotspot that corresponds to the inner canthus of the right eye person.

Despite the axis 515, 570 being described above and shown in FIGS. 5A and 5B as extending through the face of the person between eyes of the person, through an approximate center of a forehead of the person, and through an approximate center of a chin of the person, the first electronic processor 205 may not necessarily detect/identify one or more of these features of the face 505, 555. Rather, the first electronic processor 205 may be configured to detect the locations and temperatures of the inner canthi of the eyes of the person in the thermal image 500, 550 without explicitly detecting the locations of face landmarks, for example of the forehead, the chin, or other portions of the eyes of the face 505, 555.

As shown in FIGS. 4A through 4C, after performing block 420, the method 400 may proceed back to block 415 to continue to attempt to identify hotspots in a region of interest (e.g., the person's face). In some embodiments, through repetition of blocks 415 and 420, the first electronic processor 205 may exhaustively search for hotspots in the thermal image and determine whether any two hotspots have the characteristics described above that indicate that they likely correspond to the inner canthi of the person. In situations where the first electronic processor 205 is not able to locate the inner canthi of the person, the first electronic processor 205 may refrain from providing a temperature measurement/estimate and may proceed to block 435 to indicate that the subject 125 and/or the thermal camera 235 should be moved such that the inner canthi may be recognized by the first electronic processor 205 in a thermal image.

At block 425, the first electronic processor 205 determines a distance 525, 580 between the first location of the first hotspot 510, 565 and the second location of the second hotspot 520, 575 within the thermal image 500, 550. At block 430, the first electronic processor 205 determines whether the distance 525, 580 between the first location of the first hotspot 510, 565 and the second location of the second hotspot 520, 575 within the thermal image 500, 550 is within a predetermined range of distances. The predetermined range of distances may be a predetermined range of expected inner canthal distances (i.e., expected distance between the inner canthi of the eyes of humans). For example, the predetermined range of expected inner canthal distances is approximately 2.4 centimeters to approximately 3.7 centimeters or the like. However, this distance may be measured in pixels included in the thermal image. For example, the predetermined range of expected inner canthal distances includes a predetermined range of an expected number of pixels in the thermal image between the first location of the first hotspot 510, 565 and the second location of the second hotspot 520, 575. In some embodiments, the predetermined range of distances is stored in the first memory 210 of the temperature sensing device 105. In some embodiments, the predetermined range of distances (i.e., number of pixels) is selected based on a relationship between the distance 525, 580 and a distance away from the thermal camera 235 that the person is located as indicated by the distance 525, 580. For example, the distance 525, 580 will become smaller (i.e., less pixels in between the first location and the second location) for thermal images captured while the person is further from the thermal camera 235 than for thermal images captured while the person is closer to the thermal camera 235. Accordingly, based on the distance 525, 580 between the first location of the first hotspot 510, 565 and the second location of the second hotspot 520, 575 within the thermal image 500, 550, the first electronic processor 205 may be configured to determine an approximate distance that the person (i.e., subject 125) is located away from the thermal camera 235.

Based on the approximate distance that the person is located away from the thermal camera 235, the first electronic processor 205 determines whether to generate a body temperature measurement/estimate of the person. For example, the first electronic processor 205 is configured to most accurately generate body temperature measurements/estimates for objects within a certain distance from the thermal camera 235 (e.g., approximately 1.0 meters to approximately 1.5 meters or the like). To attempt to provide the greatest accuracy in temperature measurement, the first electronic processor 205 may be configured to generate body temperature measurements/estimates only when the person is within a predetermined range of distances from the thermal camera 235 (i.e., only when the distance 525, 580 between the hotspots 510, 565 and 520, 575 includes a number of pixels within the predetermined range of expected inner canthal distances).

For example, in response to determining that the distance 525, 580 between the first location and the second location within the thermal image 500, 550 is not within the predetermined range of distances, the method 400 proceeds to optional block 435. At block 435, the first electronic processor 205 controls an output device of the temperature sensing device 105 to provide an output indicating that the person (i.e., subject 125) should move with respect to the thermal camera 235. For example, the output may indicate that the person should move closer to the thermal camera 235 in response to the first electronic processor 205 determining that the distance 525, 580 is less than a lowest value within the predetermined range of distances. As another example, the output may indicate that the person should move farther from the thermal camera 235 in response to the first electronic processor 205 determining that the distance 525, 580 is greater than a highest value within the predetermined range of distances. As another example, the output may indicate that the person should move to face the thermal camera 235 more directly (e.g., because they may be standing at an angle such that the distance 525, 580 appears to be small).

In some embodiments, the output device is a visible output on the display 120, an audible output on the speaker 230, a haptic output on a haptic device, and/or the like. In general, these example outputs described above help the person (i.e., subject 125) adjust their positioning with respect to the thermal camera 235 to allow a qualifying thermal image to be captured that may be analyzed by the first electronic processor 205 as explained herein.

As indicated in FIG. 4, after performing block 435, the method 400 may proceed back to block 405 to capture another thermal image, for example, after the person has moved in accordance with the output provided by the output device at block 435. The first electronic processor 205 may then repeat the method 400.

As indicated by the dashed lines of block 435 in FIG. 4, in some embodiments, block 435 may not be performed by the first electronic processor 205/temperature sensing device 105. For example, the first electronic processor 205 may be configured to merely not generate a body temperature measurement/estimate for the person in response to determining that the distance 525, 580 between the first location and the second location within the thermal image 500, 550 is not within the predetermined range of distances. Based on the temperature sensing device 105 not generating a body temperature measurement/estimate, the person may realize that they need to move closer to the thermal camera 235, further from the thermal camera 235, and/or otherwise adjust their position in order to allow the temperature sensing device 105 to generate an accurate body temperature measurement/estimate.

Returning to block 430 of FIG. 4, in response to the first electronic processor 205 determining that the distance 525, 580 between the first location and the second location within the thermal image 500, 550 is within the predetermined range of distances, at block 440, the first electronic processor 205 generates an estimated temperature of the person (i.e., subject 125) based on at least one of the first temperature of the first hotspot 510, 565 and the second temperature of the second hotspot 520, 575. For example, the first electronic processor 205 determines that the estimated temperature of the person is the higher temperature or the lower temperature of the first temperature of the first hotspot 510, 565 and the second temperature of the second hotspot 520, 575. As another example, the first electronic processor 205 determines that the estimated temperature of the person is an average of the first temperature of the first hotspot 510, 565 and the second temperature of the second hotspot 520, 575.

At block 445, the first electronic processor 205 controls an output device (e.g., the display 120, the speaker 230, a haptic device, and/or the like) to provide an output indicating the estimated temperature of the person (i.e., the subject 125). In some embodiments, the output is a numerical value corresponding to the estimated temperature of the person. In some embodiments, the output is a pass/fail indication based on a temperature threshold previously programmed into the first memory 210 of the temperature sensing device 105. For example, the output may indicate that all temperatures under 37.0 degrees Celsius (100.4 degrees Fahrenheit) or the like are passing temperatures while all temperatures at or above this value are failing temperatures.

As should be apparent from this detailed description above, the operations and functions of the electronic processor are sufficiently complex as to require their implementation on a computer system, and cannot be performed, as a practical matter, in the human mind. Electronic processors such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot accurately determine a distance in pixels, among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A temperature sensing device comprising:
   an output device configured to provide an output;
   a thermal camera configured to capture a thermal image of a person; and
   an electronic processor coupled to the output device and to the thermal camera, the electronic processor configured to
      receive the thermal image of the person from the thermal camera,
      determine a first temperature and a first location of a first hotspot on the person and included in the thermal image,
      determine a second location of a second hotspot on the person and included in the thermal image based on the second location being approximately symmetrical with respect to the first location about an axis, and
      the second hotspot having a second temperature that is approximately equal to the first temperature,
      determine a distance between the first location of the first hotspot and the second location of the second hotspot,
      determine whether the distance between the first location and the second location is within a predetermined range of distances,
      in response to determining that the distance is within the predetermined range of distances, generate an estimated temperature of the person based on at least one of the first temperature and the second temperature, and
      control the output device to provide the output, wherein the output indicates the estimated temperature of the person.

2. The temperature sensing device of claim 1, wherein the electronic processor is configured to detect a face of the person; and
   wherein the axis extends substantially symmetrically through the face of the person.

3. The temperature sensing device of claim 2, wherein the electronic processor is configured to detect the face of the person by determining that a subset of pixels included in the thermal image have a temperature in a predetermined range of facial temperatures.

4. The temperature sensing device of claim 3, wherein the electronic processor is configured to detect the face of the person by determining that the subset of pixels define a substantially contiguous area of the thermal image that at least one of a group consisting of (i) is within a predetermined range of sizes and (ii) corresponds to one of a plurality of predetermined shapes.

5. The temperature sensing device of claim 2, wherein the electronic processor is configured to detect the face of the person by:
   detecting the face of the person in a first manner; and
   confirming the detection of the face of the person in the first manner using a second manner of facial detection different than the first manner, the second manner of facial detection including determining that the face of the person detected in the first manner corresponds to a subset of pixels included in the thermal image that have a temperature in a predetermined range of facial temperatures and that define a substantially contiguous area of the thermal image that is within at least one of a group consisting of a predetermined range of sizes and a predetermined range of shapes.

6. The temperature sensing device of claim 1, further comprising a blackbody device configured to be positioned such that the blackbody device is included in the thermal image captured by the thermal camera, wherein the electronic processor is configured to:
   at least one of retrieve and receive a reference temperature of the blackbody device; and
   determine at least one of the first temperature and the second temperature based on a relative difference between the reference temperature and the at least one of the first temperature and the second temperature.

7. The temperature sensing device of claim 6, wherein the electronic processor is configured to:
   determine that the blackbody device is at least partially occluded in the thermal image; and
   in response to determining that the blackbody device is at least partially occluded in the thermal image, control the output device to provide a second output indicating that the blackbody device is at least partially occluded in the thermal image.

8. The temperature sensing device of claim 1, wherein the electronic processor is configured to:
   determine that the distance between the first location and the second location is not within the predetermined range of distances; and
   in response to determining that the distance is not within the predetermined range of distances, control the output device to provide a second output indicating that the person should move with respect to the thermal camera,
      wherein the second output indicates that the person should move closer to the thermal camera in response to determining that the distance is less than a lowest value within the predetermined range of distances, and
      wherein the second output indicates that the person should move farther from the thermal camera in response to determining that the distance is greater than a highest value within the predetermined range of distances.

9. The temperature sensing device of claim 1, wherein the electronic processor is configured to determine the first temperature and the first location of the first hotspot by determining that the first temperature is within a predetermined range of temperatures.

10. The temperature sensing device of claim 1, wherein the first location corresponds to a first inner canthus of a first eye of the person and the second location corresponds to a second inner canthus of a second eye of the person.

11. A method for determining a temperature of a person, the method comprising:
    capturing, with a thermal camera of a temperature sensing device, a thermal image of the person;
    receiving, with an electronic processor of the temperature sensing device, the thermal image of the person from the thermal camera;
    determining, with the electronic processor, a first temperature and a first location of a first hotspot on the person and included in the thermal image;

determining, with the electronic processor, a second location of a second hotspot on the person and included in the thermal image based on
the second location being approximately symmetrical with respect to the first location about an axis, and
the second hotspot having a second temperature that is approximately equal to the first temperature;
determining, with the electronic processor, a distance between the first location of the first hotspot and the second location of the second hotspot;
determining, with the electronic processor, whether the distance between the first location and the second location is within a predetermined range of distances;
in response to determining that the distance is within the predetermined range of distances, generating, with the electronic processor, an estimated temperature of the person based on at least one of the first temperature and the second temperature; and
controlling, with the electronic processor, an output device to provide an output indicating the estimated temperature of the person.

12. The method of claim 11, further comprising detecting, with the electronic processor, a face of the person, wherein the axis extends substantially symmetrically through the face of the person.

13. The method of claim 12, wherein detecting the face of the person includes determining, with the electronic processor, that a subset of pixels included in the thermal image have a temperature in a predetermined range of facial temperatures.

14. The method of claim 13, wherein detecting the face of the person includes determining, with the electronic processor, that the subset of pixels define a substantially contiguous area of the thermal image that at least one of a group consisting of (i) is within a predetermined range of sizes and (ii) corresponds to one of a plurality of predetermined shapes.

15. The method of claim 12, wherein detecting the face of the person includes:
detecting, with the electronic processor, the face of the person in a first manner; and
confirming, with the electronic processor, the detection of the face of the person in the first manner using a second manner of facial detection different than the first manner, the second manner of facial detection including determining that the face of the person detected in the first manner corresponds to a subset of pixels included in the thermal image that have a temperature in a predetermined range of facial temperatures and that define a substantially contiguous area of the thermal image that is within at least one of a group consisting of a predetermined range of sizes and a predetermined range of shapes.

16. The method of claim 11, further comprising:
at least one of retrieving and receiving, with the electronic processor, a reference temperature of a blackbody device, the blackbody device configured to be positioned such that the blackbody device is included in the thermal image captured by the thermal camera; and
determine, with the electronic processor, at least one of the first temperature and the second temperature based on a relative difference between the reference temperature and the at least one of the first temperature and the second temperature.

17. The method of claim 16, further comprising:
determining, with the electronic processor, that the blackbody device is at least partially occluded in the thermal image; and
in response to determining that the blackbody device is at least partially occluded in the thermal image, controlling, with the electronic processor, the output device to provide a second output indicating that the blackbody device is at least partially occluded in the thermal image.

18. The method of claim 11, further comprising:
determining, with the electronic processor, that the distance between the first location and the second location is not within the predetermined range of distances; and
in response to determining that the distance is not within the predetermined range of distances, controlling, with the electronic processor, the output device to provide a second output indicating that the person should move with respect to the thermal camera,
wherein the second output indicates that the person should move closer to the thermal camera in response to determining that the distance is less than a lowest value within the predetermined range of distances, and
wherein the second output indicates that the person should move farther from the thermal camera in response to determining that the distance is greater than a highest value within the predetermined range of distances.

19. The method of claim 11, wherein determining the first temperature and the first location of the first hotspot includes determining, with the electronic processor that the first temperature is within a predetermined range of temperatures.

20. The method of claim 11, wherein the first location corresponds to a first inner canthus of a first eye of the person and the second location corresponds to a second inner canthus of a second eye of the person.

* * * * *